United States Patent [19]
Tkyva

[11] 3,812,360
[45] May 21, 1974

[54] METHOD AND ARRANGEMENT FOR DETERMINATION OF PLANAR DISTRIBUTION OF LOW-ENERGY BETA NUCLEIDES AND OTHER RADIONUCLEIDES FOR TRACER EXPERIMENTS IN BIOLOGICAL, BIOCHEMICAL AND CHEMICAL EXPERIMENTAL SYSTEMS

[75] Inventor: Richard Tkyva, Praha, Czechoslovakia

[73] Assignee: Ceskoslovenska akademie ved, Praha, Czechoslovakia

[22] Filed: July 6, 1971

[21] Appl. No.: 159,974

[30] Foreign Application Priority Data
July 8, 1970 Czechoslovakia ............... 4804-70

[52] U.S. Cl. .................... 250/83.3 R, 250/71.5 S
[51] Int. Cl. ............................................. G01t 1/16
[58] Field of Search .................. 250/71.5 S, 83.3 R; 23/230 B

[56] References Cited
UNITED STATES PATENTS
3,549,887    12/1970    Hansen ........................ 250/71.5 S 3,431,413    3/1969    Anderson et al. .............. 250/71.5 S

OTHER PUBLICATIONS

Reynolds, G. T.; "Scintillomicroscope for Radioactive Tracer Detection," The Review of Scientific Instruments, Vol. 39, No. 3, March 1968, pp. 298–302.

Bender et al., "The Autofluoroscope," Nucleonics, Vol. 21, No. 10, Oct. 1963, pp. 52–56.

*Primary Examiner*—Walter Stolwein
*Assistant Examiner*—Davis L. Willis
*Attorney, Agent, or Firm*—Murray Schaffer

[57] ABSTRACT

The planar distribution of low-energy beta nucleides and other radionucleides in different specimens is determined by placing a specimen in a camera, provided with a semiconductor detector, generating a relative scanning movement between the specimen and the detector and evaluating the thus obtained impulses while controlling the scanning as to the length of individual steps and accuracy and determining simultaneously the contours of the specimen.

12 Claims, 4 Drawing Figures

METHOD AND ARRANGEMENT FOR DETERMINATION OF PLANAR DISTRIBUTION OF LOW-ENERGY BETA NUCLEIDES AND OTHER RADIONUCLEIDES FOR TRACER EXPERIMENTS IN BIOLOGICAL, BIOCHEMICAL AND CHEMICAL EXPERIMENTAL SYSTEMS

BACKGROUND OF INVENTION applications

This invention relates to the determination of the planar distribution of low-energy beta nucleides, such as for example, Hydrogen 3 and carbon 14 used as indicators for tracer analysis in biological, biochemical and chemical experimental systems such as for instance, in histological sections, for gel electropheresis or for partition chromatography on paper or thin films. The described method also permits in such experimental systems the determination of the planar distribution of other radionucliedes, that is, beta nucleides with a higher energy spectrum of emitted electrons such as for instance, Phosphorous 3, as well as nucleides with low-energy of emitted gamma quantums such as for instance, Americum 241 or nucleides with internal conversion of emitted gamma quantums to monoenergetic electrons such as for instance, Barium 133. It is possible to proceed with the determination both for individual radio nucleides and for a plurality of radio nucleides simultaneously in the measured sample. The method also allows determination of one or more of such nucleides in individual, unrelated samples, such as for instance, in residues from evaporation of a plurality of samples on pans.

The solution of many problems in biology, biochemistry and organic chemistry is solely possible by means of tracer analysis through the application of radioactive indicators. The present invention is particularly useful for determining a radioactive beta-nucleides and permits the biologist or chemist to determine their distribution in an experimental system with related speed and facility. The low-energy of emitted electrons of such nucleides generally requires specific detection systems. This is particularly so when determining lower values of radioactivity, such as usually encountered in tracer experiments. From a practical viewpoint, only autoradiography has been used for the determination of the distribution of low energy beta-nucleides in different areas of samples where the samples must not be damaged and where differentiating properties of individual measurements have to be accomplished or samples having areas of the size of up to one square millimeter.

A particular drawback of autoradiography is the long time interval of exposure. Another drawback is the long time interval for development, particularly for low energy radioactivity. The exposure of a sample on a photographic emulsion frequently takes up to several weeks. Consequently, the accomplishment of a series of respective tracer experiments is thus substantially delayed. Autoradiography allows a simultaneous determination of a larger number of radio nucleides in a single specimen at least to a limited extent either by means of absorption of the radiation or by recording individual nucleides on special emulsions in different colours. The evaluation of an autoradiographis record is, however, in certain cases subject to individual errors of the experimenter and the record can be considered to be of qualitative value only under the conditions in which the experiment proceeds. The autoradiographic record is, furthermore, determined on the entire area of the specimen in the same manner.

SUMMARY OF THE INVENTION

In contrast, the method of this invention differs from known methods in execution, in the preparation of the measured specimen and in that it enables also the determination of the planar distribution of a larger number of different radio nucleides, including low energy beta-nucleides in biological, biochemical and chemical experimental systems, with an automatic record of objectively measured values within a relatively short time interval and with the detection of the radioactivity of individual nucleides at different places on the specimen with different accuracy and with different resolving power.

The tested sample is according to this invention placed in a measuring chamber where a radioactivity detector, for instance a semiconductor detector is present and then causing a relative movement of the sample with respect to the detector by a motion gear in order to scan individual parts of the sample by the detector which converts radioactive impulses to voltage impulses. The thus obtained impulses being passed into a device for analyzing of the impulses and evaluating them graphically or numerically or in both ways, simultaneously. The motion gear and the evaluation of the impulses is controlled according to a predetermined program which establishes the direction and length of a step or movement of the sample and the speed and place of scanning, whereby the contours of the sample are also detected simultaneously.

The adjustment of the working conditions and their stability are simultaneously checked in a simple way. The fully automated evaluation of the detected impulses at individual places is accomplished either numerically by the number of measured impulses within a chosen time interval or graphically either as impulse rate or by different colours which indicate the order or impulses measured within the chosen time interval. It is possible to use these individual evaluation methos simultaneously. The contours of the sample are simultaneously determined by a special contour detector. A change of sample can be made relatively quickly and easily. The proposed method enables the determination of a relatively low radioactivity as well as small differences in radioactivity between two places of a specimen.

The method of this invention has extensive applications for instance, it can be used in histology, genetics, physiology, pharmacology, molecular biology, biochemistry and organic chemistry as utilized in the health service industry, agriculture and other similar industries.

DESCRIPTION OF THE DRAWINGS

An exemplary embodiment of an arrangement or system of apparatus for executing the method according to this invention is schematically indicated in the accompanying drawings, wherein.

It is to be under-stood that the various elements in the system are readily available commercially and may be replaced by commercially available equivalent elements so long as they interact, as shown.

DESCRIPTION OF PREFERRED EMBODIMENT

Figure 1:
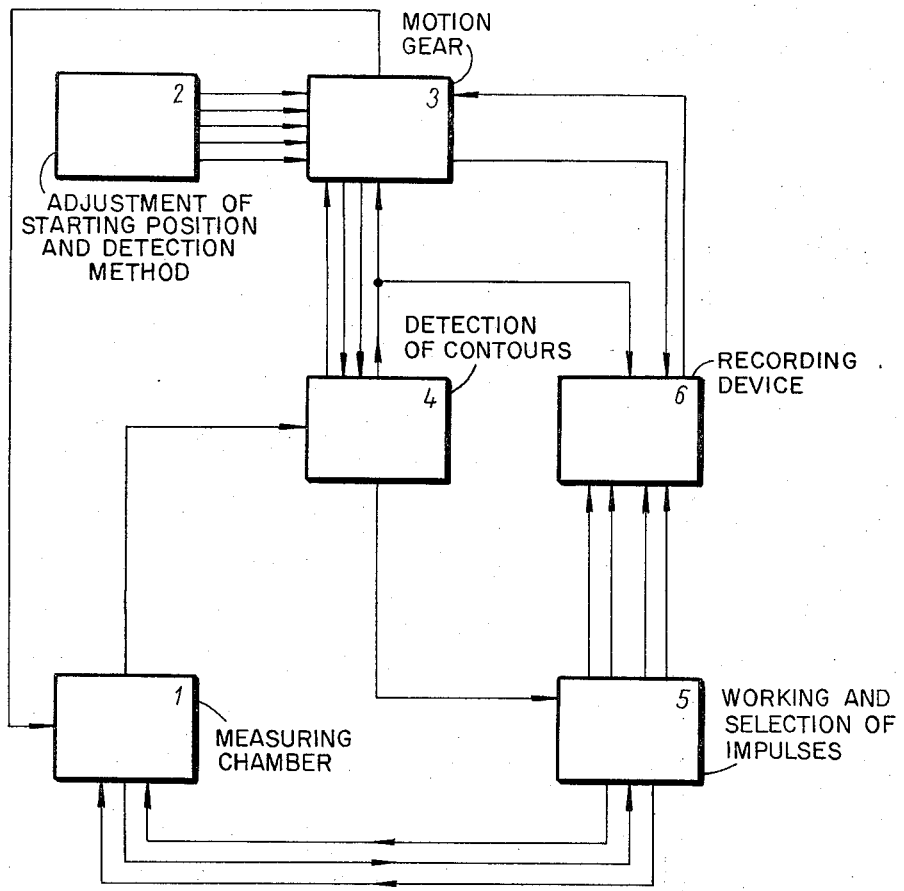
FIG. 1 is a diagram of a suitable system or arrangement.

The whole arrangement can be considered to consist of six fundamental parts indicated in FIG. 1, that is, the measuring chamber 1, the device 2 for adjusting the starting position of the sample and for selecting the detection method, the motion gear 3, the device 4 for detection of the contours of the sample, the device 5 for selection and analysis or working of impulses from the radioactivity detector and the recording device 6.

Figure 2:
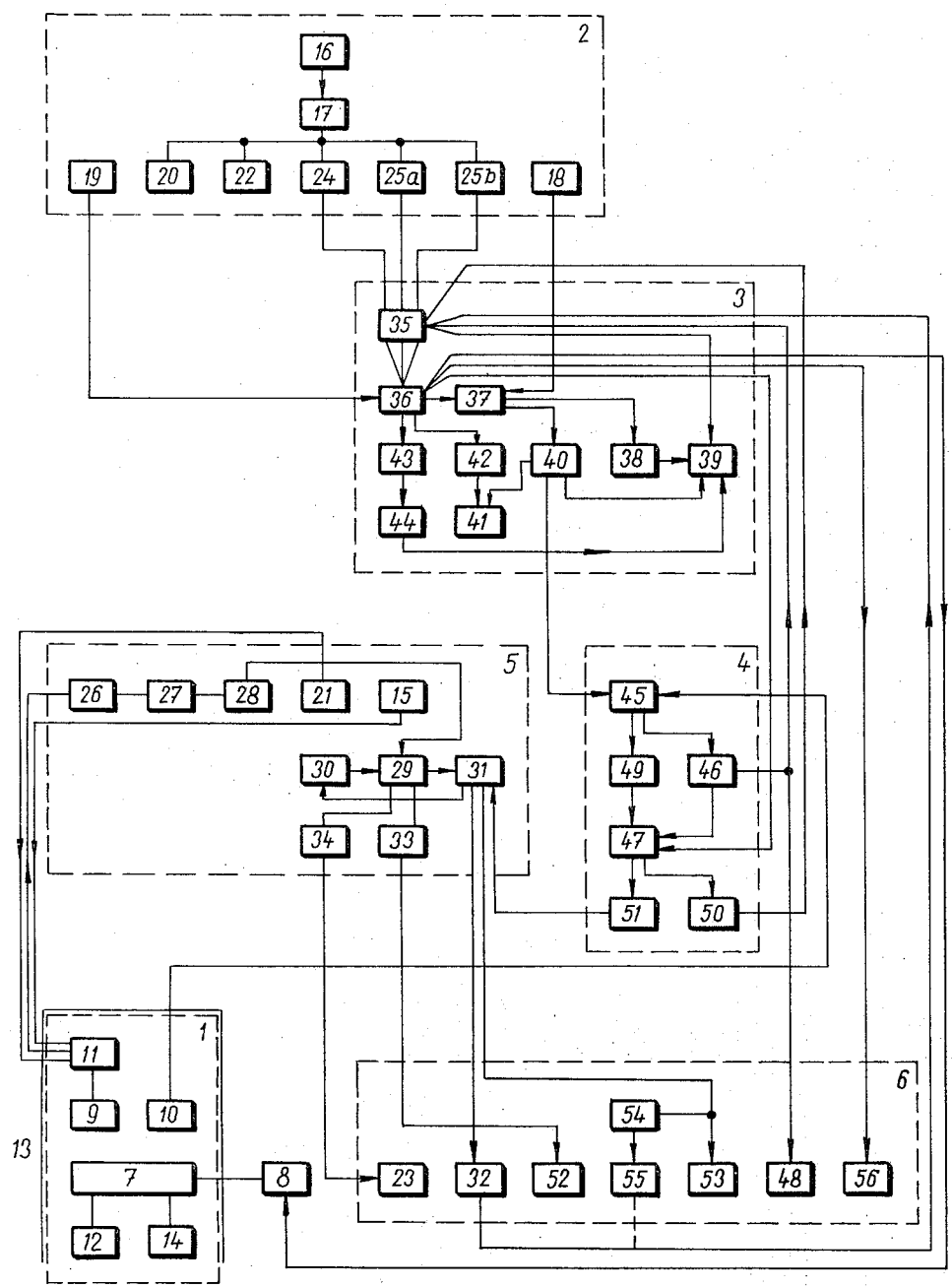
FIG. 2 shows the more important parts of the whole system and their interconnection.
Figure 3:
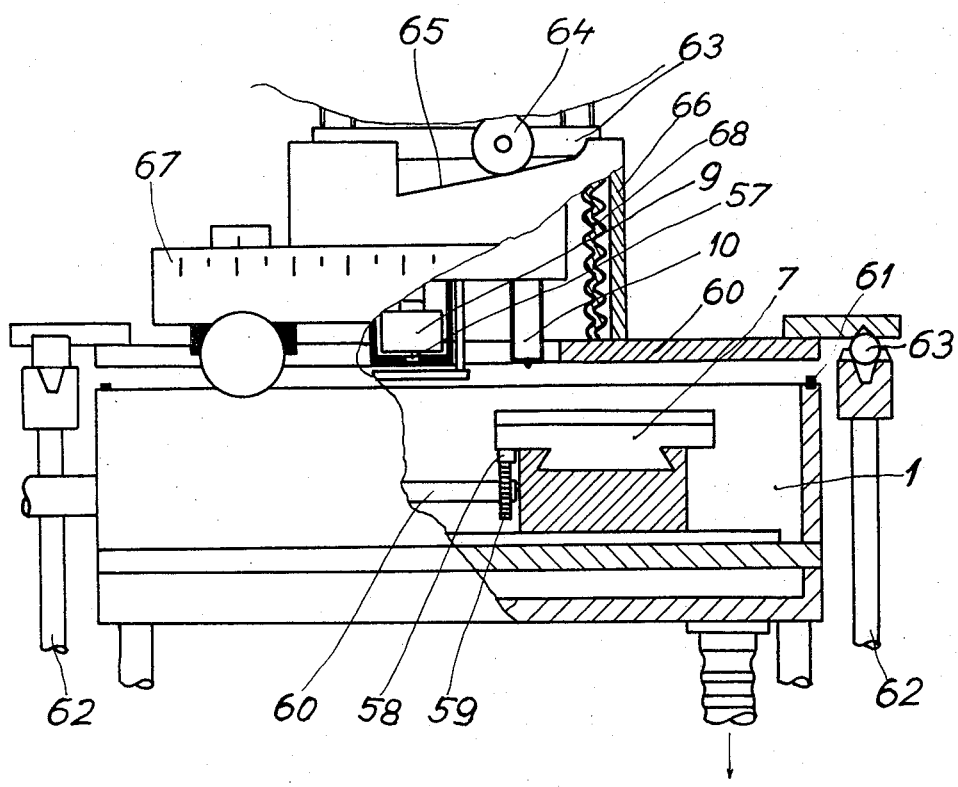
FIG. 3 shows an elevation of the measuring chamber with parts in section.
Figure 4:
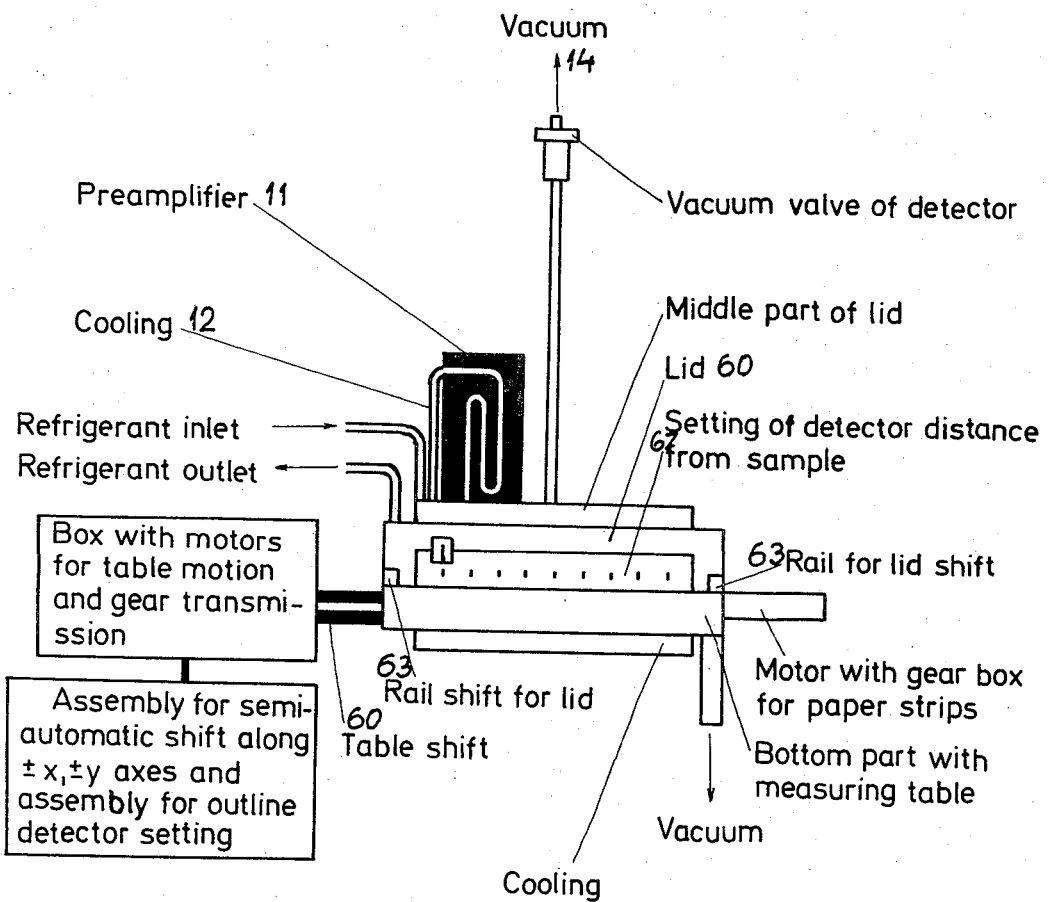
FIG. 4 a diagram showing the most important supply and discharge conduits of the measuring chamber.

According to FIG. 2, a board 7 is placed in the measuring chamber 1. The measuring chamber 1 is in more detail shown in FIG. 3 and 4. The board 7 is slidable along a system of two coordinates advantageously perpendicular, actuated over racks 58 and pinions 59 on shafts 60, driven by electric motors, controlled advantageously by thyristor switches 8 (see FIG. 2). The measuring chamber 1 is provided with a lid 60 with an air tight packing 61 and means are provided, enabling to raise the lid 60 with all appliances fixed thereto and to shift it in the horizontal direction beyond the measuring chamber 1. In FIG. 3 vertically adjustable posts 62 are indicated, supporting sliding rails 63, along which the lid 60 may be displaced after lifting. A semiconductor detector 9, for instance a silicon detector, is arranged in the lid 60. In addition a detector 10 to determine the contours of the sample is arranged in the lid 60, this detector 10 operating by means of a mechanical vertically movable feeler, the amplified movement of which is utilized for indicating the presence of the sample under the feeler. A similar contour detector, when properly adjusted, is capable to detect samples with a small height, for instance of 0.02 mm. The semiconductor detector 9 and the contour detector 10 are supported by a head 63, resting by way of rollers 64 on inclined guidings 65 of a tube 66, which can be deviated around a vertical axis. A scale 67 indicates the position of the detectors 9 and 10. Air tight bellows 68 secure thereby the air tight connection with the measuring chamber 1. The semiconductor detector 9 can be, if needed, provided with a removable screen 57 with an opening defining the width of the bundle of detected particles. The screen can be exchanged according to the required width of the bundle.

A vacuum tight seal is inserted between the lid and the base. A low noise preamplifier 11 is directly fixed to the lid. The semiconductor detector 9 and the input part of the preamplifier 11 can be cooled by an additional cooling device 12. Such an arrangement is, for instance, desirable for the detection of Hydrogen 3. In order to reduce the background noise and to increase the sensitivity of detection, a mechanical screen 13, FIG. 1 such as a lead layer of high radiochemical purity, can be provided. The specimen to be measured is first treated so as to be stable under evacuation and in a prolonged vacuum of the order of $10^{-5}$ Torr by suitable treatment to remove water and/or organic vapors which could damage the semiconductor detector. The prepared sample or a plurality of samples is after opening the chamber placed on the mobile board 7 and if necessary fixed thereto. The lid is also provided with a container of a suitable drying agent. The chamber is closed after inserting the sample and evacuation of the chamber is carried out by means of an attached vacuum apparatus 14 until a vacuum of the order of $10^{-5}$ Torr is achieved.

Prior to the insertion of a sample, the apparatus is calibrated to obtain stable base conditions. The semiconductor is preset while under a vacuum in the order of $10^{-5}$ Torr with an applied voltage from source 15 which is also under tight vacuum closure, maintaining, therefor, a fixed stable voltage on the detector even in the course of opening or closing the measuring chamber for insertion of samples. As soon as the sample has been inserted and a vacuum of the order of $10^{-5}$ Torr is again established, the vacuum tight closure of the detector is opened and the system is prepared for operation. If the chamber has been aerated prior to inserting the sample, the whole interior of the chamber is evacuated at a vacuum of the order of $10^{-5}$ Torr for at least two hours and, thereafter, within a further hour, the voltage on the detector is increased until the working value of the voltage is reached. The aeration is accomplished with air free of water or organic vapours above the limit determined by requirements of the radioactive detector.

When manufacturing the measuring chamber, it is advisable to check the radiochemical purity of all construction materials and to select with particular care material of high radiochemical purity for parts which are close to the radioactive detector. Nickel, electrolytic copper and soft steel, obtained from products older than twenty years, are examples of materials which can be used as basic construction materials. It is necessary to check the radiochemical purity of all these materials.

Prior to starting the planar detection, for instance in the course of evacuating the measuring chamber 1, the operator orients the board by selecting starting coordinates by means of device 16 to the required place under the detector. Simultaneously, the recording device 6, for colour recording is brought into the proper location and the detection system is selected by means of device 17, the amplitude interval of the recorded impulses being selected by device 5. The recording method is also selected, at this time, by device 6.

Device 17 for selecting the detection system offers five mutually exclusive possibilities. The first possibility is calibrating by means of device 20, whereby a signal from a test impulse generator 21, used for adjustment and verification of the stability of the energy calibration of the recording device is brough to the input of the preamplifier 11. If no such test is used, it is advisable to check each adjustment of working conditions of the radioactivity detection system and their stability in introducing suitable nucleides emitting monoenergetic particles of ionizing radiation under the detector and performing the respective test measurement. The second possibility of selecting of the detection is by means of device 22 for determination of radioactivity on paper bands, advanced above board 7 by means of an electric motor and a coil at selected speeds equal to speeds of the recording device 23. The methods of selection using devices 24 and 25a differ only in that the first works along a single coordinate, the second along two mutually perpendicular coordinates $x$, $y$. The device 18 serves for the adjustment of the length of one step and the device 19 for the adjustment of the overall length of the advance in both mutually perpendicular coordinates x, y. The last possibility of selection is by way of the device 25b which serves for measuring of individual separate samples, such as for instance, residues from evaporation of samples on pans at constant lengths of distance in direction of both coordinates.

These possibilites enable one to measure different places on the surface of the board 7 with different methods according to chosen coordinates and a selected system.

The possibility of the determination of individual nucleides at optimum conditions and the possibility of the determination of a number of nucleides in a single sample enables one to adjust the corresponding gain and the shaping in the linear amplifier by means of circuits 26 and the discriminating levels in a single channel broad band amplitude analyzer 27. The voltage impulses with amplitudes which are suitable for adjusted shaping within the chosen amplitude interval, are brought to the shaping device 28, where these impulses are shaped for the input of the impulse counter 29. The callibration of the shaping of the voltage impulses obtained from the detector, of the gain of the amplifier and of the discriminating levels can be made on an energy calibration by means of primary standards of several radionucleides, such as for instance, Barium 133, Cadmium 105, Cobalt 57, and Americum 241.

The time interval for determining the time of individual measurings of radioactivity is adjusted by the timing device 30. By changing the adjustment of this timing device, the accuracy of measuring of the radioactivity can be changed in the required manner.

The remaining functional elements of device 5 are adjusted to permanent values. The starting of the timing device 30 is accomplished by the control unit 31 registering the number of impulses on the impulse counter 29 within a time interval, determined by the timing device 30 of the printing device 32.

In case of a graphical record with different colours the record from the impulse counter 29 is brought to a converter 33. If the record has to be made graphically in measured impulse rates in the recording device 23, the record from the impulse counter 29 is brought to the integrator 34.

As a single channel is used, it is necessary in the presence of a plurality of radio nucleides in the sample to perform the adjustment of the elements 26 and 27 for each nucleide separately and repeat the scanning of the sample for each nucleide. A simultaneous determination of a plurality of radio nucleides in the course of a single scanning operation can be achieved when using a larger number of selection channels, that is, an amplifier with shaping circuits 26 and analyzer 27, or a multichannel amplitude analyzer for working and recording of voltage impulses in individual time intervals. After the required working conditions in the chamber 1 have been reached and the required values in parts 2 and 5 have been adjusted, the start 35 is released. Thus, the pace maker 36 in the x direction is brought to action transmitting to the pace counter 37 and causing it to make a step. If the distance is smaller than the adjusted length "$a$" of one step, that is, $x<a, y<a$, the order goes over 38 to the blocking circuit 39, from where a new order is transmitted to the start 35. These operations are repeated in step units as long as the required length of step has been reached. The order goes, thereafter, over 40 to the step 41, that is, $x \quad a, y \quad a$, in order to stop counting of step units and for blocking of any further action by the blocking unit 39 and also to the device 4 for detection of the contours.

The advance is thereafter accomplished by the pace maker 36, enabling an advance according to the method described above by way of device 42, so that the overall distance of advance, adjusted in direction of the coordinate x by means of the device 19 is achieved. As soon as this limit of advance is achieved, the order from the pace maker 36 goes over the device 43 to the change-over switch 44 for the direction of the coordinate y, which transmits, by way of the blocking circuit 39, a signal to the start 35. Consequently, the condition for connecting of 36 to 43 is met and the counting of the pace units is blocked in the pace counter. Therefore, the last step, if it is not complete, will not be performed. The advance in direction of the coordinate y and the change-over to the direction of the coordinate x are performed similarly.

The impulse transmitted from the device 40 into part 4 reaches the device 45 which controls the contour detector and is connected with the contour detector 10. If the contours are not recorded, the signal goes over the device 46 to the start 35 and simultaneously to the sliding register 47, which has the capability of determining whether at the given place a contour is present after a further constant number of steps, in the course of which the radioactivity detector scans this place.

Where a graphical colour record is used, the recording device 48 records in addition to the colour record, that the place is beyond the investigated area of the sample, if such is the case. If the contour detector comes above the sample, the information passes by way of the device 49 to the sliding register 47 and no record is made by the recording device 48.

After the above mentioned constant number of pace units has been made, the sliding register 47 has on its output the recorded information, whether the radioactivity detector 9 is or is not above the sample. If it is not above the sample, the impulse goes over the device 50 to the start 35. If it is above the sample, it transmits a signal over the device 51 to the control unit 31 and the measuring of the radioactivity is started as already described with reference to part 5.

The colour record is performed in five colours. The sixth colour indicates the absence of the sample. The colours are differentiated by impulse rates measured in in units per minute up to the order of $10^4$ impulses per minute. The operation of the device 52 for colour adjustment is derived from the decades of the impulse counter 29 by way of the converter 33 and the operation of the colour printing device 53 by way of the control unit 31. The colours are erased by the device 55 by means of a retarding circuit 54. The movement of the printing device of the colour recorder is controlled from the pace maker 36 by electric motors with thyristor switches 56. The record is performed on transparent paper from below, so that the proceeding measurement is always visible. After erasing of colours, the device 55 transmits an impulse to the start 35 for making another step in the described manner.

The advise to the start 35 for making another step occurs in the case where a numerical record is recorded and transmitted by the printing devise 32. If no numerical record is made, this advice is transmitted, as already mentioned, after erasing the colours directly from the

EXAMPLES

The present invention may be used to determine the distribution of the nucleide carbon 14 in histological or tissue slices (for examples of slim or internal organs). A suitable example of such investigation can be made of the ontogenetic growth of mice embryos in the presence of carbon 14 precourses of ribonucleic and deoxiribonucleic protein acids. First paraffin slices are prepared using common practice and placed on a suitable support. It is generally desirable to prepare a slice of a thickness, which enables the determination of its contours. Otherwise the colours of the support have to be determined and the position of the radioactive areas has to be found with respect to the contours of the support. After the slice is placed on the support, it is deparaffinized by means of distilled benzene and dioxane used for preparation of liquid scintillators. The support with one or more slices is subsequently dipped into a benzene bath for about 15 minutes, rinsed with benzene, dipped once more in a newly prepared benzene bath for about 15 minutes, again rinsed with benzene and thereafter in succession twice dipped for about 5 minutes into a newly prepared dioxane bath and rinsed with dioxane. The support with the specimen is after the last rinsing, left for about one hour in air at ambient temperature and then placed into a vacuum chamber under a vacuum on the order of $10^{-5}$ Torr. The support with the specimen is maintained at this vacuum for about one hour or until fixed on the mobile board of the measuring chamber.

In case of electropheresis employing combined gels of polyacrylamide-agarose which are used, for instance, for simultaneous separation of carbon 14 and Phosphorous 33, labelled ribonucleic acids from E coli, the gels are after the proper electropheresis and a optional dyeing stored for several days in one molar acetic acid at 0° C. Prior to measuring, the gel is transferred through a longitudinally cut polyethylene hose into a gel cutter where it is longitudinally cut into four parts so that from its central part two ribbons of a thickness of about 1 mm remain. The cut gel is washed off from the gel cutter into a Petri dish. One of the middle ribbons, which is to be used for the determination of radioactivity is once more, by means of the cut polyethylene hose, brought to a suitable support and together with this support to a gel drier, where it is dried in air at ambient temperature for about 12 hours. Ribbons so prepared are thereafter put into a vacuum chamber for several hours at a vacuum of the order of $10^{-5}$ Torr. Subsequently, the individual supports with the speciments are maintained under vacuum until fixed on a mobile board in the measuring chamber.

If a semiconductor detector of sufficient sensitivity is used which can operate without vacuum, the operations connected with creating a vacuum can be eliminated and some specimens do not require such treatment.

Similarly, as has been already stated, the device for determining the contours of the specimen will not be required in all cases. This device can operate differently according to the kind of specimen being examined. For histological sections, a contour detector can be used. It consists of a tiny rod of electrically non-conductive material, such as Teflon which contacts the surface of the planar support of the specimen and causing, when striking, the contour of the specimen changes in the inductance of an induction coil connected in a bridge circuit and composed of, in addition to a resistor, a capacitor and an auxiliary frequency generator. The zero position of this contour detector is adjusted by the frequency generator. After striking the contour of the specimen, this rod is raised to a point equivalent to the thickness of the specimen, signalling its contour. The sensitivity of such contour detector is within the limit of 1 micron. Histological sections have generally a thickness of 20 microns. A similar contour detector operating in front of the semiconductor and scanning the area of the specimen, is thus capable of controlling the whole scanning operation.

As examples of devices used for the described system or arrangement, a partially depleted surface barrier detector with a depletion depth of about 100 microns and an effective area of about 7 mm$^2$ (Ortec, model A-01-8-007-100) or 25 mm$^2$ (Ortec, model A-018-02-5-100) can be employed. The preamplifier 11 fixed to the top part of the lid of the measuring chamber 1 can be an Ortec amplifier model 109 A. The output of this pre-amplifier is transmitted through a linear amplifier 26 (Ortec, model 410) to the amplitude analyzer 27 (Ortec, model 420) and a shaping circuit 28 into the impulse counter 29 (tesla, Czechoslovakia model NTZ 615) actuated by the control unit 31 (Tesla, model NRZ 618) which is pre calibrated by repeated measurements. For numerical recording of impulses an Ascota, model 114 GDR can be used.

Ortec is the Trademark of the Ortec Company, 102 Midland Road, Oak Ridge, Tenn.

What is claimed is:

1. Apparatus for determination of the planar distribution of low-energy beta nucleides and other radionucleides of a specimen in tracer experiments in biological, biochemical and chemical experimental systems comprising a measuring chamber, a movable support for said specimen and a radioactivity detector mounted within said chamber, means for moving said support relative to said detector to permit said detector to scan said specimen at selected positions, means for operating said detector to emit an impulse on detection of a radionucleide at said selected position, a contour sensor for detecting the outline of the specimen means for controlling the operation of said detector at said selected position in dependence upon the sensing of the contours of said specimen and means for collecting, analyzing and selecting impulses from said radioactivity detector and recording means connected to said collecting, analyzing and selecting means.

2. The apparatus according to claim 1 including a radioactivity detector capable of generating voltage impulses with amplitudes directly proportional to the radioactive energy of a plurality of registered particles and thereby determining a plurality of radionucleides simultaneously.

3. The apparatus according to claim 1 wherein the means for recording the impulses includes multicolour graphical record according to the order of measured numbers of impulses within specified time intervals.

4. The apparatus according to claim 1 wherein the means for recording the impulses includes means for establishing numerical record of the measured number of impulses within specified time intervals.

5. The apparatus according to claim 1 wherein the means for recording the inpulses includes means for establishing graphically a record of measured impulse rates.

6. A system as set forth in claim 1 including means for shaping and amplitude discrimination of impulses from the radioactivity detector.

7. The apparatus according to claim 1 wherein said means for sensing the contours of said specimen comprises a mechanical feeler adapted to engage said specimen.

8. The apparatus according to claim 7 wherein said feeler is vertically movable emits a signal in response to the sensing of said specimen.

9. The apparatus according to claim 1 wherein said radioactivity detector is a semi-conductor.

10. The apparatus according to claim 1, including means for predetermining the path of movement of said support.

11. The apparatus according to claim 1 including means for establishing a starting position of said movement including means for varying said starting position.

12. The apparatus according to calim 1 including a sliding register for delaying the operation of said detector depending upon the sensing of the specimen by said contour detector corresponding to the distance between said detector and said contour detector.

* * * * *